US010669715B2

(12) United States Patent
Norford et al.

(10) Patent No.: US 10,669,715 B2
(45) Date of Patent: Jun. 2, 2020

(54) COMPONENTS FOR MASONRY CONSTRUCTION

(71) Applicant: Norfa Enterprises Pty Ltd., Moorooduc, Victoria (AU)

(72) Inventors: John Peter Norford, Moorooduc (AU); Trung Thann Nguyen, Moorooduc (AU)

(73) Assignee: Norfa Enterprises Pty Ltd., Moorooduc, Victoria (AU)

( * ) Notice: Subject to any disclaimer, the term of this patent is extended or adjusted under 35 U.S.C. 154(b) by 0 days.

(21) Appl. No.: 16/110,572

(22) Filed: Aug. 23, 2018

(65) Prior Publication Data

US 2018/0363296 A1 Dec. 20, 2018

Related U.S. Application Data

(63) Continuation of application No. 14/965,577, filed on Dec. 10, 2015, now abandoned.

(51) Int. Cl.

| | |
|---|---|
| ***E04C 1/39*** | (2006.01) |
| ***E04B 2/18*** | (2006.01) |
| ***E04B 2/24*** | (2006.01) |
| ***B32B 23/02*** | (2006.01) |
| ***B28B 23/02*** | (2006.01) |
| *E04B 2/02* | (2006.01) |

(52) U.S. Cl.

CPC ............ *E04C 1/397* (2013.01); *B28B 23/028* (2013.01); *E04B 2/18* (2013.01); *E04B 2/24* (2013.01); *E04C 1/395* (2013.01); *E04B 2002/028* (2013.01); *E04B 2002/0247* (2013.01); *E04B 2002/0269* (2013.01)

(58) Field of Classification Search

CPC . E04C 1/397; E04C 1/395; E04B 2/18; E04B 2/24; E04B 2002/0269; E04B 2002/0247; E04B 2002/028; B28B 23/028

USPC .............................................................. 52/606

See application file for complete search history.

(56) References Cited

U.S. PATENT DOCUMENTS 950,401 A * 2/1910 Peckman .................. E04B 1/24 52/206
1,579,213 A * 4/1926 Dille ..................... B28B 23/028 249/154
3,207,466 A * 9/1965 Vance ................... B28B 23/028 249/123
3,832,118 A * 8/1974 Mitchell ............... B28B 7/0041 425/443

(Continued)

FOREIGN PATENT DOCUMENTS

CA 2690147 A1 * 12/2008 ........... B28B 23/028
DE 1913658 A1 * 11/1970 ............... E04B 2/18

(Continued)

*Primary Examiner* — Jeanette E Chapman
(74) *Attorney, Agent, or Firm* — Smith Gambrell & Russell LLP

(57) ABSTRACT

A component is a building block having a pair of parallel load-bearing concrete side walls separated by a gap and joined by crossed metal ties which bridge the gap. The outer faces of the side walls can be covered with a decorative finish such as stone. The blocks have an added end wall which enables pillars to be built. The method of casting the blocks utilizes a collapsible metal mold which permits the side walls to be stepped.

2 Claims, 3 Drawing Sheets

(56) References Cited

U.S. PATENT DOCUMENTS

| | | | | |
|---|---|---|---|---|
| 4,591,474 | A * | 5/1986 | Scott | B28B 23/028<br>210/540 |
| 8,443,560 | B2 * | 5/2013 | Uhl | E04B 2/8635<br>52/220.1 |
| 2011/0000161 | A1 * | 1/2011 | Aube | E04B 2/46<br>52/563 |
| 2011/0047918 | A1 * | 3/2011 | Wehrli | E04B 1/4121<br>52/506.03 |

FOREIGN PATENT DOCUMENTS

| | | | | |
|---|---|---|---|---|
| DE | 2803629 | A1 * | 8/1978 | B28B 15/00 |
| GB | 1038841 | A * | 8/1966 | B28B 23/028 |

* cited by examiner

COMPONENTS FOR MASONRY CONSTRUCTION

CROSS-REFERENCE TO RELATED APPLICATIONS

This application claims priority to U.S. Non-Provisional patent application Ser. No. 14/965,577, filed on Dec. 10, 2015, which claims priority to Australian Application No. 2014246618, filed on Oct. 10, 2014, both of which are relied upon and incorporated herein in their entirety by reference.

BACKGROUND OF THE INVENTION

Field of the Invention

This invention concerns components for building construction and to methods for making them.

Background

Block work is widespread in the construction industry. Blocks for this type of work are cast in concrete and have two end walls and a central wall which creates a pair of side by side square cavities in the block. The blocks are laid in courses so the cavities lie in register and these admit reinforcing rods whereafter the cavities may be filled with concrete.

While these are especially suitable for internal walls in buildings, they are less suitable for walls and features used in landscaping where appearance is more important and block laying skills may not be available.

SUMMARY OF THE INVENTION

The apparatus aspect of the invention provides a component for masonry construction comprising a pair of parallel, load-bearing upright side members of equal size having inner and outer faces, wherein the inner faces are separated by a gap and joined by a tie structure which extends from face to face and is embedded in the side members.

These may be laid in courses like blocks to a string line without block laying still because the components have accurate geometric shape and lie in contact with each other in the finished wall.

The upper and lower longitudinal edges of both sides are stepped so as to form a lap joint when stacked on a like component.

The two ends of both side members are also stepped so as to form lap joints when butted to a like component.

The members may be composed of masonry that is a hardenable construction mix such as concrete, cementitious mixes, geopolymers and like non-cement mixes capable of being cast in molds.

The outer face of one of the members may be covered by a layer of different compositions offering additional weatherproofing, for example stone veneer, brick veneer or render to make the walls or pillars made from the components to be painted. Whereas the members may be 50 mm thick, the layer may be 15-20 mm thick.

The inner face of the member may have a different layer more suited to the interior of a building. For example, if a garage were built from the components, the outer faces of the members which are to form the inside wall surface may have a layer of plaster.

The tie structure may be a pair of metal ties with ends which are embedded in the thickness of the members and define spaces through which conduits, cables and pipes may extend. While the members find use as garden walls, gateways, doorways, pillars and part of boundary fencing, their use in buildings necessitates utilization of the continuous cavity which they provide. This cavity formed by the gap between members may be 70-80 mm wide.

The metal ties may be hollow rectangular frames with corner extensions for embedding. Alternatively the metal ties may be X-shaped again with end extensions for embedding. The ties may lie at ⅓ and ⅔ of the length of the members. The ties may be of tubular, angular or bar section being joined where they cross by welds. They are aligned in a finished wall so that reinforcement rods can extend vertically through the wall.

The second apparatus aspect of the invention provides a channel-shaped, load-bearing building component with two parallel side walls joined by an end wall, wherein the two side walls are connected by a tie structure which extends from inner wall face to inner wall face and is embedded in the side walls.

The upper, lower and end edges are stepped so as to form lap joints with the straight members of the components described above.

The purpose of the channel-shaped component is to form the end of a wall built from the components when laid in courses like brick work or block work.

The filling may be carried out by a molding machine fed by a concrete mixer.

The outer face or faces of the blocks may be veneered that is adhesive applied and a decorative layer applied to conform to the shape of the face. This may be stone, pebbles, chipped stone, artificial stone and the like.

The method aspect of the invention provides a method of making a component for masonry construction comprising the steps of preparing a mold with outside perimeter walls and inside perimeter walls on a base, inside perimeter walls having two pairs of slots arranged on a long axis of the inside perimeter, inserting a reinforcement tie into each pair of slots so that part of the reinforcement lies between the inner and outer walls of the remainder of the reinforcement spans the space between the pairs of inner walls, filling the space between the inner and outer walls with hardenable construction mix and removing the cast component from the mold by force applied to the reinforcement.

Production of the components is commenced by erecting a series of molds laid end to end so that a concrete pump can be used to fill the molds in sequence.

The mold building sequence begins by erecting pairs of end walls spaced from each other by 20 mm, each pair being 150 mm high and spaced from the next pair in line by 360 mm which is the length of the walls of the component. The end walls are connected by butting plates which form a cuboid mold which defines two cavities, one for each slab.

Some of advantageous effects of the invention include speed of construction, obviates the need for block laying skill, and allows for different decorative finishes. These and other features and advantages of the invention will become apparent to one with skill in the art upon examination of the following drawings and detailed description. It is intended that all such additional features and advantages be included herein within the scope of the present invention.

BRIEF DESCRPTION OF THE DRAWINGS

One embodiment of the invention is now described with reference to the accompanying drawings.

DETAILED DESCRIPTION OF THE DRAWINGS

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the following description, numerous specific details are set forth. However, it is to be understood that embodiments of the invention may be practiced without these specific details. In other instances, well-known methods, structures and techniques have been shown in detail in order not to obscure an understanding of this description.

Figure 1:
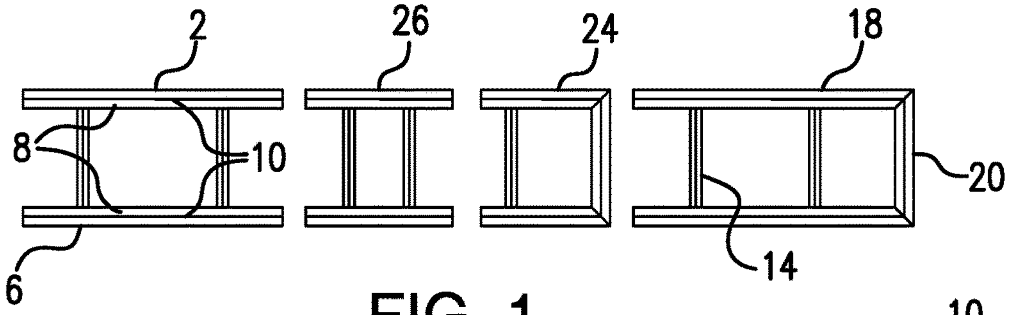
FIG. 1 shows a plan view of the variety of blocks required for wall and pillar construction.
Figure 2:
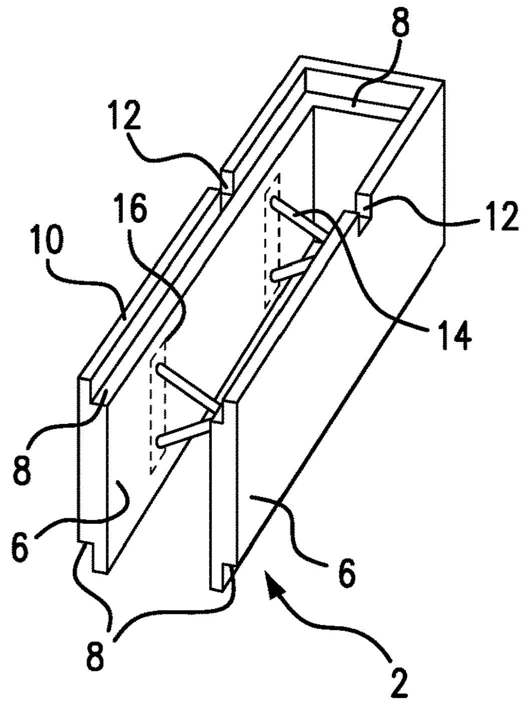
FIG. 2 is a perspective view of the endmost block in FIG. 1.
Figure 3:
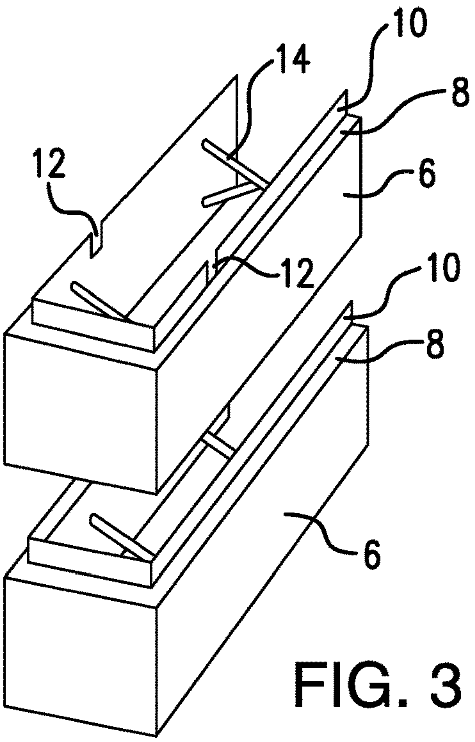
FIG. 3 is an exploded perspective view of a pair of blocks superimposed.
Figure 5:
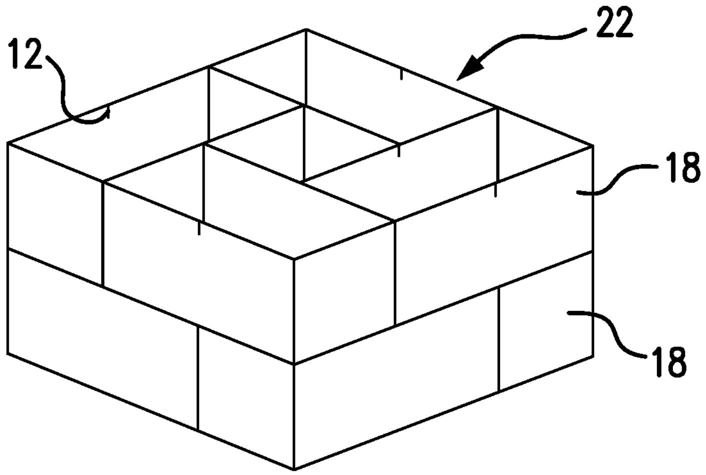
FIG. 5 shows a perspective view of the bottom two courses of a pillar made from blocks with the same shape as the endmost block in FIG. 1.

Referring firstly to FIGS. 1 and 2, the wall block 2 (180 W×360 L×150 H mm) is made from a pair of parallel concrete slabs 6, each with a rebate 8 so that when laid in courses the rebates 8 and upstands 10 form lap joints. In FIG. 2 the upstands have a groove 12 which allows the blocks to be laid at 90° forming the pillar of FIG. 5.

The slabs 6 are held parallel by embedded steel ties 14. The embedded steel ties 14 are galvanized steel rods 14 which are welded centrally to form a cross. The ends of the rods are in turn welded to steel strip plates 16 which are incorporated in the casting stage of the block.

FIG. 1 shows four versions of the block which a block layer would use in wall and pillar work. Block 18 has a pair of side walls joined by end wall 20 and ties 14. These are used to construct hollow pillar 22 shown in FIG. 5. As block 18 is 360 mm long it is advantageous to have an end block of half the length of block 18. This half end block 24 has a single tie 14. Half block 26 has two ties.

Figure 4:
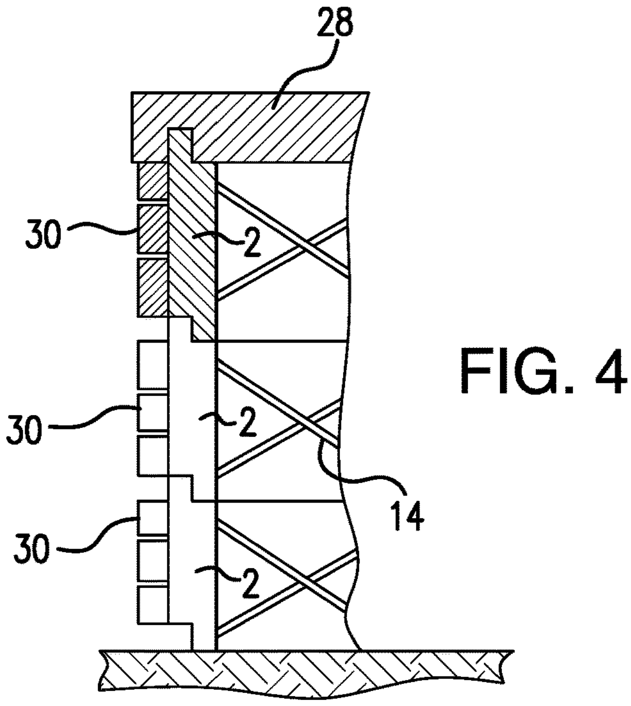
FIG. 4 shows a sectional view of part of a wall made from three courses of blocks.

In FIG. 4 the blocks 2 are laid in courses and covered by a masonry cap 28. The outer face of slab 6 is veneered with small rectangular pieces of stone 30 in ashlar style creating a decorative outer surface. In the example shown both outer faces are veneered.

Figure 6:
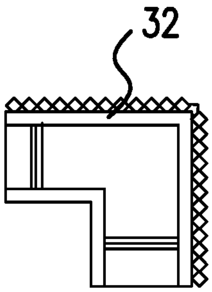
FIG. 6 is a plan view of a corner block, being a variant of the short end block of FIG. 1.

In FIG. 6 an L-shaped corner block 32 is pebble dashed on one face and braced by ties 14.

Figure 8:
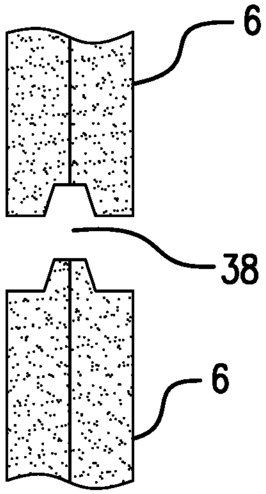
FIG. 8 is a sectional view of a fragment of two inter-fitting wall ends with a tenon and groove formation.

In FIG. 8, two inter-fitting wall ends formed from slabs 6 with a tenon and groove formation 38 are shown.

Figure 9:
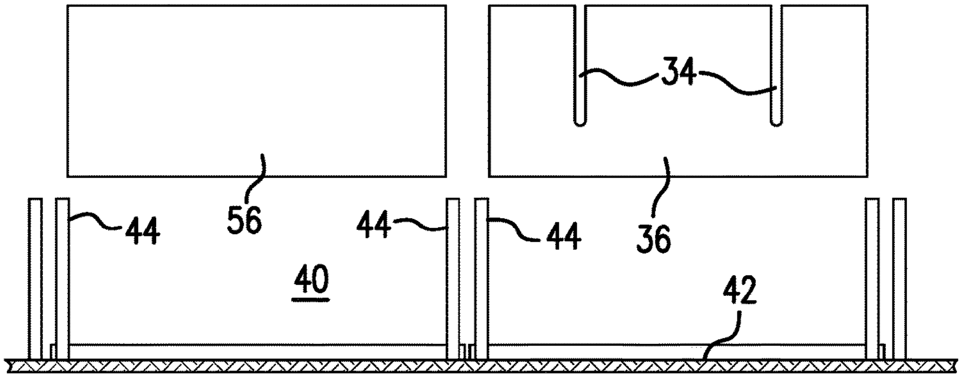
FIG. 9 is a side elevation view of a portion of a production line showing pairs of end walls with step-forming channels in position and about to receive a drop-in outer wall and a drop-in innerwall.
Figure 10:
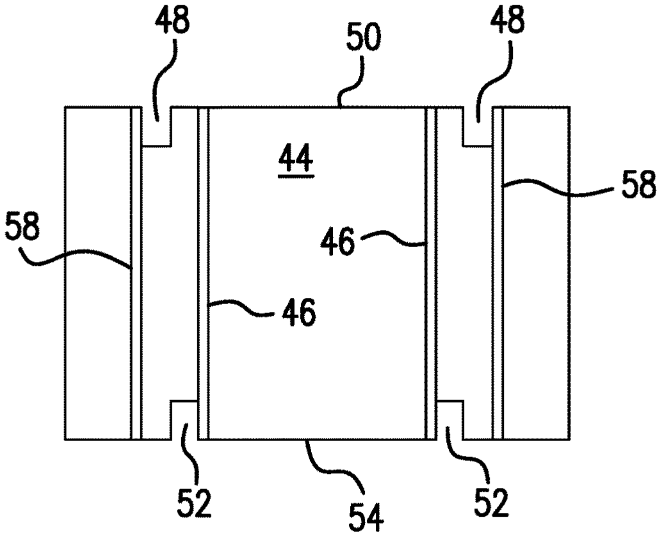
FIG. 10 is a plan view of an end wall.

In FIGS. 9 and 10 the casting molds 40 are aligned in order to be filled by a mobile mixer which travels the length of the production line.

The molds lie on a casting table 42 and consist of pairs of upright, supported end walls 44 spaced from each other. Inner walls 36 are dropped into grooves 46 in end walls 44. Each end wall 44 has square cutouts 48 in the top edge 50 and square cutouts 52 in bottom edge 54. Outer walls 56 drop into grooves 58. End walls 44 imprison pairs of inverted steel channels 60 which lie on the molding table 42. These ensure that the added concrete forms a cast step in the slab wall along the bottom edge of the slab. Likewise cutouts 48 capture pairs of steel channels 62 in order to cast a step in the top edge of the slab.

Figure 7:
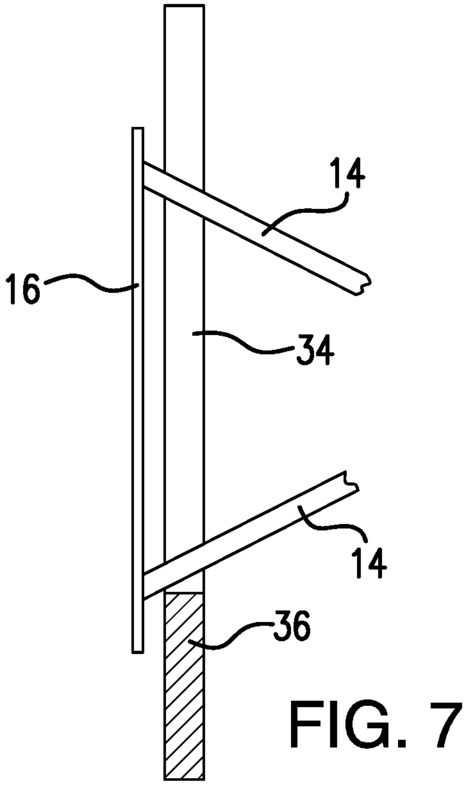
FIG. 7 is a side elevation view of a fragment of the mold showing an inner wall with a slot housing a portion of the metal tie which spans the block walls.
Figure 11:
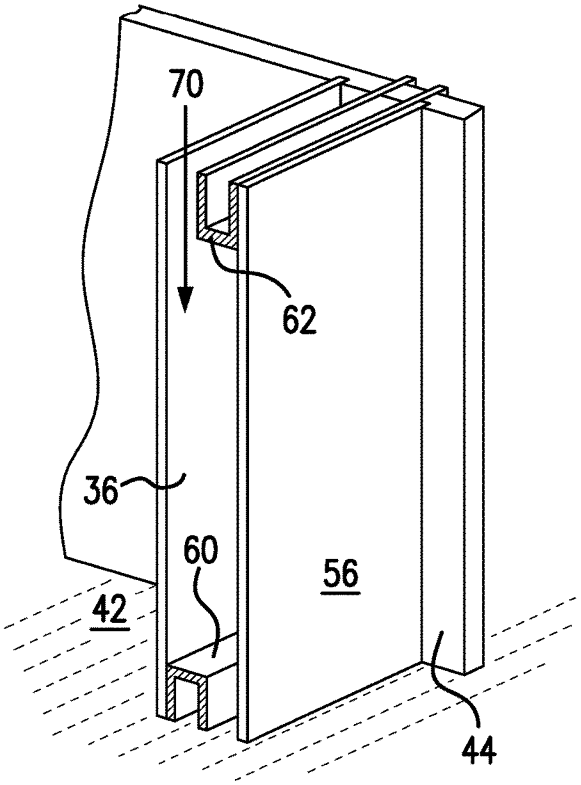
FIG. 11 is a sectional perspective view of a fragment of a mold in the production line of FIG. 9 showing two walls and two channels ready to be charged with concrete.

Concrete enters the gap 70 in FIG. 11. When the ties 14 are inserted in slots 34, with the ties 14 extending through the slots 34 of the inner wall and the strip plates 16 being aligned with the gap, as shown in FIG. 7, casting ensues and when the slabs 6 are set, the mold is collapsed, cleaned and reassembled. The strip plates 16 are not visible being embedded in the mix.

It is to be understood that the word “comprising” as used throughout the specification is to be interpreted in its inclusive form, i.e., use of the word “comprising” does not exclude the addition of other elements.

It is to be understood that various modifications of and/or additions to the invention can be made without departing from the basic nature of the invention, These modifications and/or additions are therefore considered to fall within the scope of the invention.

What is claimed is:

1. A method of casting a masonry component comprising the steps of:

erecting a pair of upright end walls to form a mold;

joining the end walls with a pair of outer walls and a pair of inner walls lying parallel to the outer wall spanning the two inner walls with a pair of cross-shaped reinforcement ties which extend through the inner walls; and filling the mold space between the inner and outer walls with hardenable construction mix, whereby the cross-shaped reinforcement ties are embedded in the mix, wherein the pair of upright end walls are provided with pairs of cutouts in the top and bottom edges and channel pieces are inserted in the pair of cutouts in order to create a step in the top of each cast wall and the bottom of each cast wall.

2. The method as claimed in claim 1, wherein the inner walls are slotted in order to admit the cross-shaped reinforcement ties during the mold sequence.

* * * * *